Feb. 21, 1939.  W. L. JONES ET AL  2,147,651
METHOD OF MULTICOLOR INTAGLIO PRINTING
Filed June 9, 1937
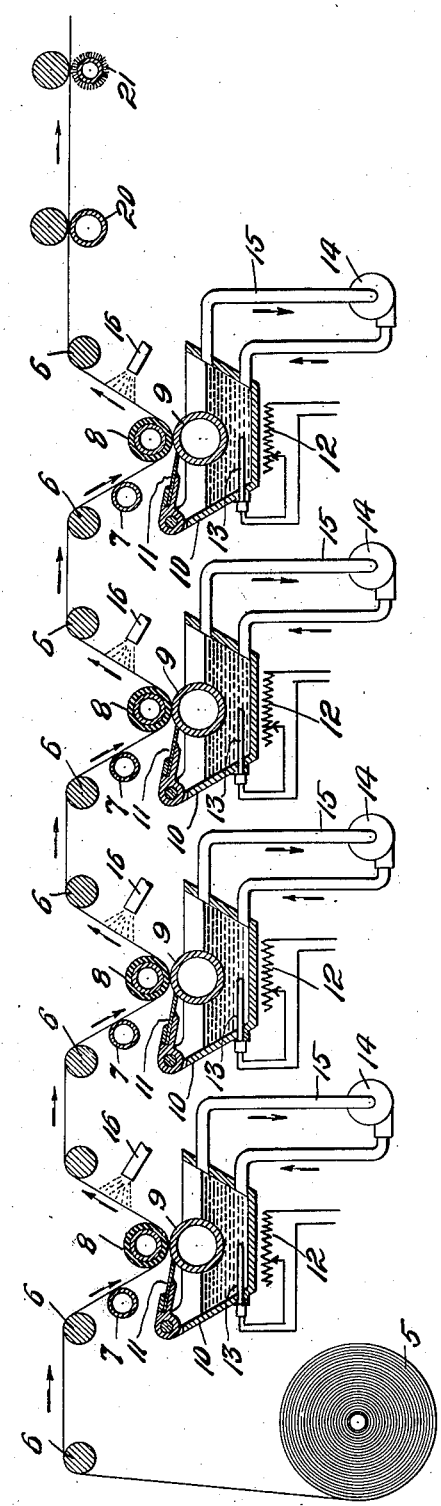
INVENTOR
Wilbur L. Jones
BY Earl Hudson McLeod
Robert W. Byerly
ATTORNEY Patented Feb. 21, 1939

2,147,651

UNITED STATES PATENT OFFICE

2,147,651

METHOD OF MULTICOLOR INTAGLIO PRINTING

Wilbur L. Jones, New York, N. Y., and Earl Hudson McLeod, Rutherford, N. J., assignors to Interchemical Corporation, New York, N. Y., a corporation of Ohio Application June 9, 1937, Serial No. 147,210

8 Claims. (Cl. 101—170)

This invention relates to a novel method of multi-color, intaglio printing.

Intaglio printing is carried out by means of engraved plates or rolls. In order to produce a good print the ink must be sufficiently fluid to enter and fill the cavities in the plates or rolls, any excess being wiped off by a doctor blade. In multi-color printing, particularly as carried out by high speed presses, it is desirable to print the several colors, usually four, in rapid succession. This is accomplished by printing one color, drying the print, printing the second color adjacent the first color, again drying the print, and repeating these operations for the additional colors.

Intaglio inks having the necessary fluidity for use of high speed presses have commonly been composed of pigment suspended in a thin, volatile liquid or vehicle. Due to the thin consistency of these vehicles, there is a tendency for each succeeding color to bleed into adjacent areas to which a color or colors have previously been applied. This is, of course, objectionable, particularly where one color is not entirely dry before the next color is printed. Moreover, in the use of such inks containing volatile liquids it is difficult to avoid changes in the consistency of the ink, due to evaporation in the inking fountains of the press. When the prints are dried by heat, to evaporate the liquid, the vapors produced are not only disagreeable in the pressroom, but also involve the risk of fire, due to their inflammability.

In accordance with the present invention, the need for the use of thin, volatile liquids in high speed, multi-color, intaglio printing is eliminated.

The present method of multi-color, intaglio printing comprises heating an ink whose vehicle consists essentially of a normally solid, readily-liquefiable, amorphous substance to a temperature at which said substance melts and becomes a fluid, printing said ink by means of the usual intaglio printing members, cooling or chilling the printed ink to rapidly congeal said substance, and repeating these operations for the next color, using as the vehicle of the second ink a substance which is fluid at a temperature below the melting point of the first ink and slightly above the congealing point of said substance, so that the second ink can be applied without appreciably softening the previously solidified ink, and can be instantly congealed to a solid condition without excessive chilling. The inks for the third and fourth colors differ from the next preceding inks by similar differences in melting and congealing points.

The substances which have been found to be particularly advantageous as vehicles for printing inks in the present method are those which become highly fluid at temperatures slightly above their melting points, and which have sharp congealing points so that they will change from a fluid condition to a solid condition within a narrow temperature range. There are preferably employed, as at least one of the ink vehicles, substances which exhibit the phenomenon of supercooling, that is to say, which can be maintained liquid below their melting points. The normally solid substances, which we have found suitable, for this purpose are amorphous (that is to say, noncrystalline) and hard when in the solid state. Otherwise, the ink tends to granulate and rub off when subjected to pressure and friction, for instance during the handling of large stacks of finished printed material.

These and other features of this invention will become more apparent in connection with the following detailed description of an illustrative embodiment of the present method. Reference is made to the accompanying diagrammatic flow sheet showing one form of apparatus by which this method may be carried out.

In the drawing, a web of paper from supply 5 passes over suitable guide rolls 6, and thence over a hot roll 7 which warms the paper prior to the printing operation. The web then passes between impression cylinder 8 and intaglio cylinder 9 which receives ink from a fountain 10. A suitable doctor blade 11 is provided for wiping excess ink from the intaglio roll or cylinder. It is important to maintain the ink in the fountain at a temperature at which it is molten, and yet close to the temperature at which it congeals. For this purpose, any suitable heating device may be employed, such as an electric heater 12 controlled by a thermostat 13 which regulates the temperature of the ink in the fountain to within about plus or minus 10° F. In cases in which the ink vehicle exhibits the phenomenon of supercooling, the fountain temperatures may be a few degrees below the temperatures needed to initially melt the inks. Preferably the printing cylinder is in direct contact with the hot ink in the fountain, and will be at approximately the same temperature. The use of separate, heated printing cylinders is not required. The ink may be supplied to the fountain by suitable means which maintain a constant level and also thoroughly agitate the ink to secure uniform distribution of the pigment and vehicle. For this purpose, a pump 14 may be employed for circulating the ink from a suitable source of supply (not shown) into the fountain. A constant level return duct 15 serves to carry any over-flow back to the pump 14.

After the web leaves the printing cylinder, it is promptly subjected to a chilling action, which may be accomplished by suitable means, such as a jet of cold air directed against the printed face of the web, as indicated at 16, or by means of a cold roll.

A series of presses are employed, one for each of the colors to be printed. Each of the presses may be constructed similarly to the one described, the several parts being identical in each case, in the form illustrated. It will be understood that the cylinders 7 which warm the paper just prior to the printing operation are not heated to such temperature that they tend to soften the ink which has previously been applied to the paper. Following the final printing operation, the web may be heated and burnished by suitable rolls 20 and 21, arranged so as not to melt or disturb the printed ink.

The first ink printed, which has the highest melting point, should be fluid in the fountain of the press at temperatures preferably below 200° F., because inks which are solids at higher temperatures are apt to solidify excessively rapidly in the air. On the other hand, the lowest melting point ink should not tend to melt at temperatures much below 150° F. because, if it does, it is apt to smear in hot climates. Moreover, in the four-color printing process, there must be a substantial difference between the temperatures at which the successive inks melt, or become molten. If this difference is too small, then one ink tends to fuse into the other; if too great then the aforementioned preferred outside limits are exceeded in the four-color process. Melting point differences of about 15° to 20° F. may be used without exceeding the upper and lower temperatures mentioned, by employing, as the vehicle for at least one of the inks, substances which exhibit the phenomenon of supercooling, so that the ink may be maintained fluid at temperatures below that required to convert it from a solid to a liquid. The sharpness of the multicolor printing is accentuated because of the practically instantaneous solidification of the ink directly after it strikes the paper.

In order to illustrate the present method of multi-color, intaglio printing, the following specific example is set forth.

The ink which is first printed has the highest melting point. A suitable ink for this purpose has the following composition:

| | Parts by weight |
|---|---|
| Pigment: | |
| Chrome yellow | 20 |
| Vehicle: | |
| Hydrogenated castor oil | 75 |
| W. W. gum rosin | 5 |
| Total | 100 |

This ink is a yellow ink which has a melting point of about 180° F. When chilled, it congeals on reaching a temperature slightly below 180° F., and is not remelted by contact with the ink next applied, which is used at a temperature 10° to 20° F. below this melting point.

The following composition is an example of an ink which can be used as the second ink in the four-color process:

| | Parts by weight |
|---|---|
| Pigment: | |
| Lithol toner | 10 |
| Vehicle: | |
| Hydrogenated castor oil | 79.4 |
| Abietic acid | 10.6 |
| Total | 100 |

This ink is a red ink which has a melting point of about 165° F. When cooled, it congeals on reaching a slightly lower temperature, and does not remelt when subjected to the heat of the next ink which is used at a temperature about 10° to 20° F. below 165° F. The abietic acid lowers the melting point of the hydrogenated castor oil.

The following ink is an example of the third ink which may be employed in the present method:

| | Parts by weight |
|---|---|
| Pigment: | |
| Prussian blue | 13 |
| Vehicle: | |
| Hydrogenated soya bean oil | 65.7 |
| Carnauba wax | 13.1 |
| W. W. gum rosin | 8.2 |
| Total | 100 |

This ink is a blue ink which has a melting point of about 151° F. When cooled, it congeals rapidly on reaching a slightly lower temperature, and does not remelt when subjected to heat of the next ink, which is used at a temperature about 10° to 20° F. below 151° F. The carnauba wax increases the melting point of the hydrogenated soya bean oil.

For the vehicle of the fourth ink, there is preferably employed a mixture which exhibits the supercooling property to a high degree. Such a vehicle may be composed as follows:

| | Parts by weight |
|---|---|
| Hydrogenated soya bean oil | 83.3 |
| W. W. gum rosin | 16.7 |
| Total | 100 |

With this vehicle there is mixed a suitable proportion of black or brown pigment such as gilsonite or carbon black, or gilsonite or other bitumen may be mixed with hydrogenated oil alone. The gilsonite may constitute about one-third of the total ink, while the carbon black may be used in considerably smaller proportion. This vehicle has a melting point of about 150° F., similar to the melting point of the third ink, but it can be maintained fluid at much lower temperatures. It can be used at temperatures substantially below 151° F. and slightly above 133° F. When chilled, it congeals rapidly on reaching temperatures slightly below 133° F.

The vehicles of these inks thus contain major proportions of hydrogenated vegetable oils, which are particularly satisfactory for present purposes. Each of the vehicles also contains a minor proportion of a resin which is adapted to impart tack to the ink, so that it will transfer properly from the printing cylinders to the paper. It will be appreciated that these constituents may be replaced by other equivalent materials. For instance, in place of the hydrogenated vegetable oil there may be used stearic acid, Opalwax No. 10 made by E. I. du Pont de Nemours, Wax "S" or Wax "OP" made by I. G. Aktiengesellschaft of Germany, or other equivalent heat-liquefiable, amorphous (non-crystalline) substances having sharp melting points. W. W. gum rosin and abietic acid may be replaced by another resin, natural or synthetic, or by ordinary rosin, or by Glyco Wax B430, which is a synthetic wax or resin made by the Glyco Products Company of Brooklyn, New York, or by similar equivalents which have the effect of making the ink slightly tacky. Furthermore, we may replace hydrogenated soya bean oil by some other hydrogenated vegetable oil, by stearic acid, by a hydroxy-stearic acid, or by some other equivalent substance which melts sharply at a suitable temperature. It is advisable to use substantially pure substances, since certain impurities tend to prevent the ink from congealing sharply.

For most purposes, it is important that the ink vehicle have sufficient hardness to prevent the ink from rubbing off under pressure. Good results are obtained, in this respect, by employing as the ink vehicle a substance or mixture which has a hardness number of about 6–8 (100 times the depth of penetration, measured in millimeters with a Pusey & Jones plastometer, using a ⅛" ball under 1 kg. weight). Advantageous substances are those whose hardness, as indicated by such penetration, remains constant over a period of time. That is to say, the indicated penetration should not be markedly higher at the end of ten minutes than the initial penetration. The hydrogenated vegetable oils and Opalwax No. 10 mentioned, have hardness numbers of less than 10 at the end of a ten minute test with the plastometer identified above.

If desired, a small amount of hardening agent such as ethyl cellulose or East India gum, may be added to increase the hardness of the inks, without substantially affecting the melting points or causing excessive brittleness.

In compounding these inks, the pigment may be mixed with the resin and a small proportion of the hydrogenated vegetable oil, and ground at high temperature, after which the balance of the ingredients may be added, and the mixture reground if necessary. Oil soluble dyes may be used in place of pigments.

The present method thus enables four-color printing to be carried out by means of high speed, intaglio presses, without the need for evaporation of volatile solvents. It also avoids the disadvantage due to one color running into another, since the heat-liquefiable vehicles are rapidly congealed to hard solids when their temperatures are lowered a few degrees below the temperatures at which they are liquid. Due to the elimination of large proportions of volatile solvents, the concentration of the coloring material in the ink may be increased, with consequent advantages.

It will be appreciated that while certain temperatures have been indicated as satisfactory, and that while differences of about 15° to 20° F. between the melting points or congealing points of the successive inks are satisfactory, the invention, in its broader aspects, is not restricted to particular operating temperatures. No claim is made herein to the particular inks employed, without prejudice to the right to claim these in other applications.

What we claim is:

1. Method of intaglio printing which comprises successively printing in contiguous relation a series of normally solid printing inks having progressively decreasing congealing points, each ink being printed at a temperature above its congealing point and below the congealing point of the preceding ink.

2. Method of intaglio printing which comprises printing a normally solid ink at a temperature above its congealing point and then printing in contiguous relation to said ink another normally solid ink having a lower congealing point, chilling the printed ink, the second printing being at a temperature between the congealing points of the two inks.

3. Method of multi-color, intaglio printing which comprises heating an ink, whose vehicle consists essentially of a normally solid, heat-liquefiable amorphous substance which rapidly congeals from a liquid to solid, to a temperature at which said substance melts, printing said ink, cooling the printed ink to congeal said substance, heating a different-colored ink, whose vehicle consists essentially of a normally solid, heat-liquefiable amorphous substance which is molten at temperature lower than the melting point of the first substance, to such lower temperature, printing said second-named ink, and chilling this ink to congeal the same.

4. Method of multi-color, intaglio printing which comprises printing in succession, and at temperatures less than about 15° to 20° F. above their respective congealing temperatures, a series of inks the vehicles of which consist essentially of normally solid, heat-liquefiable, amorphous substances each of which is capable of rapidly congealing from a liquid to a solid at a temperature about 15° to 20° F. below the congealing point of the preceding ink, and cooling each printed ink prior to the application of the next ink.

5. Method of intaglio printing which comprises successively printing in contiguous relation a series of normally solid inks having progressively decreasing melting temperatures, each ink being printed at a temperature above its melting point and below the melting point of the preceding ink, all of said inks having melting points between about 150° F. and 200° F., and one of said inks having a congealing point substantially below its melting point.

6. Method of printing which comprises successively printing in contiguous relation a series of normally solid inks having progressively decreasing melting temperatures, each ink being printed at a temperature above its melting point and below the melting point of the preceding ink.

7. Method of printing which comprises successively printing in contiguous relation a series of normally solid printing inks having progressively decreasing congealing points, each ink being printed at a temperature above its congealing point and below the congealing point of the preceding ink, and cooling each ink below its congealing point immediately after it is printed and before the next ink is printed.

8. Method of multi-color, intaglio printing which comprises heating an ink, whose vehicle consists essentially of a normally solid wax which rapidly congeals from a liquid to a solid, to a temperature at which said wax melts, printing said ink, chilling the printed ink to congeal said wax, heating a different-colored ink, whose vehicle consists essentially of a normally solid wax which is molten at temperature lower than the melting point of the first-named wax, to such lower temperature, printing said second-named ink, and chilling this ink to congeal the same.

WILBUR L. JONES.
EARL HUDSON McLEOD.

CERTIFICATE OF CORRECTION.

Patent No. 2,147,651. February 21, 1939.

WILBUR L. JONES, ET AL.

It is hereby certified that error appears in the printed specification of the above numbered patent requiring correction as follows: Page 1, first column, line 16, for the word "of" read on; page 3, first column, line 66, claim 2, after "point" insert the comma, words and comma , chilling the printed ink,; line 69, same claim, strike out "chilling the printed ink," and that the said Letters Patent should be read with this correction therein that the same may conform to the record of the case in the Patent Office.

Signed and sealed this 9th day of May, A. D. 1939.

Henry Van Arsdale (Seal) Acting Commissioner of Patents.